3,210,657
RESISTANCE-CHANGE TEMPERATURE SENSING APPARATUS FOR A.C. MOTOR WINDINGS HAVING A.C. AND D.C. SOURCES IN SERIES

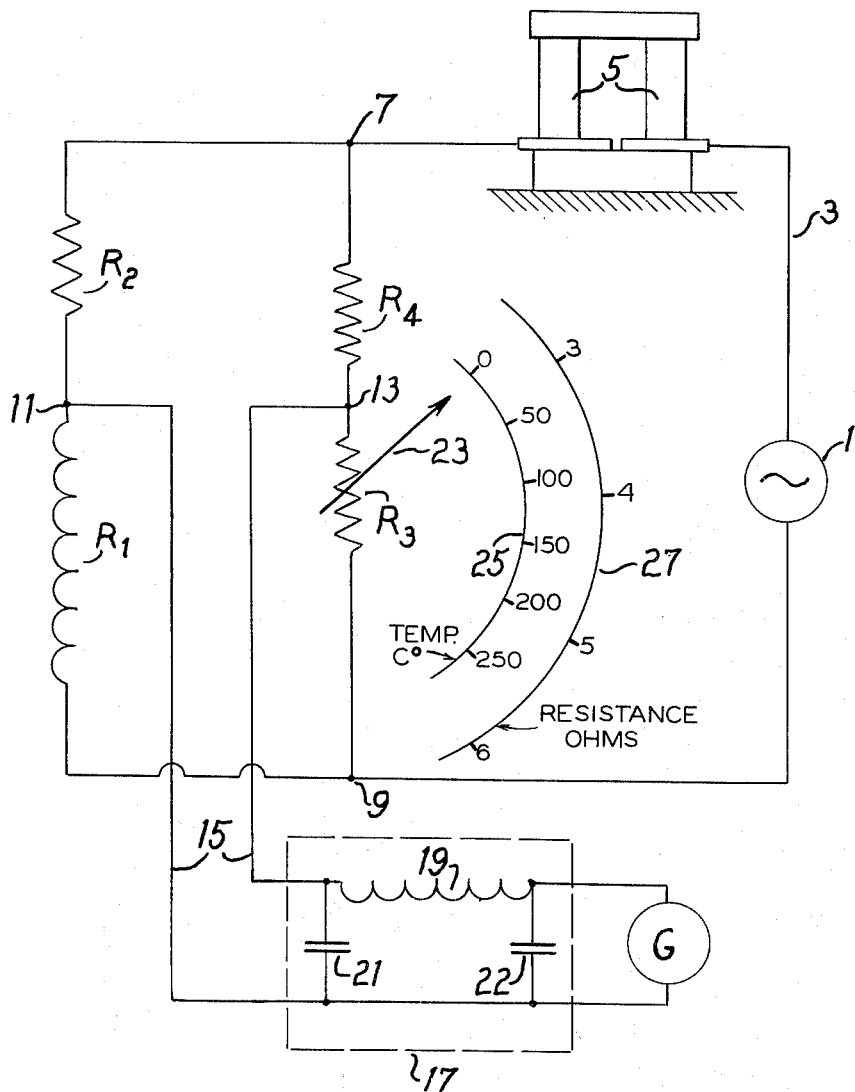

Charles D. Flanagan, Attleboro, Mass., assignor to Texas Instruments Incorporated, Dallas, Tex., a corporation of Delaware
Filed Aug. 12, 1960, Ser. No. 49,332
4 Claims. (Cl. 324—62)

This invention relates to resistance-measuring apparatus useful primarily, though not exclusively, for temperature measurements of electrically energized conductive devices, and more particularly to such apparatus for windings, the temperatures of which are desired to be known while they are subjected to excitation by an A.C. current.

Among the several objects of the invention may be noted the provision of compact, convenient, low-cost continuous resistance-change temperature-measuring apparatus for energized devices such as A.C. motor windings, transformer windings or the like; the provision of apparatus of this class which does not, as heretofore, require large and expensive load blocking capacitors; and the provision of apparatus of the class described which by elimination of such large capacitors reduces power losses. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

The accompanying drawing, in which one of various possible embodiments of the invention is illustrated, is a circuit diagram thereof.

It is often desirable to measure the electrical resistance of a winding energized by alternating current, such as an A.C. motor winding, transformer winding or the like, without deenergizing the winding, and more particularly in those cases in which the resistance thus measured is to be employed for determination of the winding temperature. As is known, the resistances and temperatures of such conductive devices are correlated, so that when the former are determined, so are the latter. It has also been known that best results can be attained by resistance determinations obtained while a winding, for example, to be measured is energized. The former manner of accomplishing this end has been subject to certain disadvantages, among which was the requirement of isolating capacitors in the winding load circuit. This involved costly capacitors and power loss. By means of the present invention, capacitors of the former isolating type are not required, such as shown, for example, in U.S. Patents 2,578,455 and 2,825,027.

Referring now more particularly to the drawing, $R_1$ indicates a motor winding, the resistance of which is to be measured in order to evaluate its correlated temperature. Numeral 1 indicates for example, a 60-cycle 117-volt source for winding excitation. As known, the winding temperature may change from time to time, depending upon various factors, such as ambient temperature, load current, overload current, locked-rotor current, and the like. The source 1 is wired to the winding resistance or load $R_1$ through a circuit 3 which includes a low-impedance D.C. source 5, preferably constituted by a thermocouple, but which alternatively may be a D.C. battery. A requirement of the D.C. source 5 is that it shall pass A.C. current without substantial voltage drop, as compared with that of resistance $R_1$. The D.C. source 5 has for its purpose a supply of D.C. for a network forming a Wheatstone resistance bridge, one arm of which is constituted by the motor winding resistance or impedance $R_1$. This bridge includes input terminals or junctions 7 and 9 through which load current is supplied from the A.C. source 1 and through which resistance-measuring current is supplied from the D.C. source 5. The bridge includes a second arm in which is an impedance formed by a resistance $R_2$ in series with the winding resistance $R_1$. Resistance $R_2$ may, as is preferable, be of a comparatively small value such as for example, $\frac{1}{10}$ ohm. The bridge also includes a fourth arm formed by fixed impedance in the form of a resistance $R_4$. Resistance $R_4$ is in series with an adjustable impedance formed by a resistance $R_3$. Resistance $R_3$ forms a third arm. The resistances $R_4$ and $R_3$ are connected in parallel with the resistances $R_2$ and $R_1$. At output terminals or junctions 11 (between $R_1$ and $R_2$) and 13 (between $R_3$ and $R_4$) are connected leads 15 which connect through a low-pass filter circuit or network 17 with an indicator such as a galvanometer G. The latter has a scale including a null point 0 indicating the condition of zero current flow therethrough, as will occur when the D.C. potentials at points 11 and 13 are equal.

The filter circuit 17 is of the so-called low-pass type designed, for example, by use of a suitable inductance coil 19 and suitable capacitors 21 and 22 to have a natural frequency approximately equal to the line frequency, thereby shunting A.C. around the galvanometer G at the frequency of the A.C. power source but permitting D.C. to flow to the galvanometer G. Values for the components such as 19 and 21 required to form a low-pass filter circuit 17 are not specified in detail, since they may readily be computed for any desired A.C. source conditions.

At numeral 23 is indicated an adjusting device for the resistance $R_3$. This may include a suitable pointer 23 associated with a temperature scale such as shown at 25 and adjacent which (for purpose of illustration) is shown a correlated resistance scale 27. Ordinarily the resistance scale would not be required when temperatures only are to be indicated.

By adjusting $R_3$ the bridge circuit can be balanced to provide equal D.C. potentials at junctions 11 and 13. This is accomplished while A.C. and D.C. are flowing by adjusting resistace $R_3$ until a zero or null reading is obtained on the galvanometer G. Then the scale 25 (and 27, if desired) is calibrated so that the scale reading is correct for a known resistance and a corresponding known temperature of $R_2$. Thereafter as the resistance $R_1$ changes with load current variations therein, the device 23 may be adjusted to new positions to bring about null readings on the galvanometer G. The result will be indications on the scales 27 and 25 of any changed resistances and correlated temperatures of the winding resistance $R_1$.

It should be understood that other means for filtering or eliminating the effect of the A.C. signal on the galvanometer may be employed instead of the filter circuit 17, as shown and described above. Mechanical filter means, for example, could be employed, such as a galvanometer having a low natural frequency (e.g., on the order of 10 cycles per second) which would be unresponsive to a 60-cycle A.C. line signal.

It will be understood that means other than the calibrating means 27 shown on the drawing may be employed for determining the resistance $R_1$ upon adjusting $R_3$. Thus $R_1$ can be calculated from the equation $$R_1 = \frac{R_2 R_3}{R_4}$$

where $R_2$, $R_3$ and $R_4$ are known. Resistances $R_2$ and $R_4$ are known constants and there are various conventional ways of ascertaining $R_3$ for any given adjustment thereof.

Advantages of the arrangement are:

Unlike the prior arrangements, there are no load blocking capacitors in the connections between the winding resistance $R_1$ and the A.C. source 1. This not only eliminates the high cost of capacitors for the purpose but eliminates their attendant power losses. The smaller capacitors 21 and 22 herein are not subject to these disadvantages. Moreover, the low value of the resistance $R_2$ involves little power loss, and the same is true of the low impedance D.C. source 5.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Apparatus for measuring A.C. motor winding temperatures during motor operation, comprising an A.C. source, a D.C. source, a Wheatstone bridge having a pair of input terminals and a pair of output terminals, said A.C. source and said D.C. source being connected in series with each other across the input terminals of said bridge, said bridge including said winding as one arm thereof, said D.C. source having a sufficiently low A.C. impedance to pass A.C. current without substantial voltage drop as compared with the voltage drop of said winding, said bridge including as a second arm a resistance in series with said winding, said resistance having a small value as compared with the resistance of the winding, said bridge also including third and fourth arms consisting of resistances one of which is adjustable, a D.C. circuit including a galvanometer and filter means connected with said output terminals and adapted to pass D.C. but not to pass A.C. at the frequency of said A.C. source, and calibration means for varying said adjustable resistance in the network by which the resistance of said winding and its temperature are determined by adjusting said resistance to obtain a null reading of said galvanometer.

2. Apparatus according to claim 1, wherein said D.C. source is constituted by a thermocouple.

3. Apparatus according to claim 1, wherein said D.C. source is constituted by a battery.

4. Resistance-change temperature sensing apparatus for an A.C. electromagnetic winding comprising an A.C. circuit having an A.C. power source therein, a source of D.C. power in said A.C. circuit connected in series with said A.C. source, said D.C. power source having a sufficiently low A.C. impedance to pass A.C. current without substantial voltage drop as compared with the A.C. voltage drop of said winding, a bridge network having input terminals in said A.C. circuit placing the network in series-circuit relation with said D.C. and A.C. sources for normal energization of said electromagnetic winding by said A.C. source, said bridge network including said winding connected in one arm thereof and having output terminals, and an output circuit connected to said output terminals and including sensing means responsive to D.C. only to respond to resistance changes in said A.C. winding.

References Cited by the Examiner
UNITED STATES PATENTS

| | | | |
|---|---|---|---|
| 2,152,439 | 3/39 | Miller. | |
| 2,476,317 | 7/49 | Nelson et al. | 323—75 X |
| 2,565,922 | 8/51 | Howard | 324—57 X |
| 2,635,225 | 4/53 | Hadady | 324—62 X |
| 2,728,337 | 12/55 | Guillemin | 73—27 X |
| 2,782,102 | 2/57 | Howe | 324—62 X |
| 2,919,404 | 12/59 | Rock | 324—87 X |
| 3,004,216 | 10/61 | Hauf | 324—57 X |

WALTER L. CARLSON, *Primary Examiner.*

SAMUEL BERNSTEIN, *Examiner.*

UNITED STATES PATENT OFFICE
CERTIFICATE OF CORRECTION

Patent No. 3,210,657                           October 5, 1965

Charles D. Flanagan

It is hereby certified that error appears in the above numbered patent requiring correction and that the said Letters Patent should read as corrected below.

Column 2, lines 65 to 67, the equation should appear as shown below instead of as in the patent:

$$R_1 = \frac{R_2 R_3}{R_4}$$

Signed and sealed this 28th day of June 1966.

(SEAL)
Attest:

ERNEST W. SWIDER                         EDWARD J. BRENNER
Attesting Officer                      Commissioner of Patents